United States Patent
Kerndlmaier

Patent Number: 5,594,824
Date of Patent: Jan. 14, 1997

[54] COUPLING DEVICE BETWEEN A GLASS FIBER AND A DIELECTRIC WAVEGUIDE

[75] Inventor: Walter Kerndlmaier, Berlin, Germany

[73] Assignee: Institut für Mikrotechnik Mainz GmbH, Mainz-Hechtsheim, Germany

[21] Appl. No.: 355,053

[22] Filed: Dec. 13, 1994

[30] Foreign Application Priority Data

Dec. 23, 1993 [DE] Germany .......................... 43 44 179.3

[51] Int. Cl.⁶ .................................................. G02B 6/30
[52] U.S. Cl. .................................. 385/49; 385/83; 385/43
[58] Field of Search ................................ 385/14, 43, 49, 385/48, 50, 51, 88, 130, 83

[56] References Cited

U.S. PATENT DOCUMENTS

| | | | |
|---|---|---|---|
| 4,243,297 | 1/1981 | Elion | 385/48 |
| 4,474,429 | 10/1984 | Yoldas et al. | 385/49 |
| 5,425,118 | 6/1995 | Sugihara et al. | 385/51 |

FOREIGN PATENT DOCUMENTS

| | | | |
|---|---|---|---|
| 2550630 | 2/1985 | France | 385/65 |
| 4134940A1 | 4/1993 | Germany . | |
| 4142850A1 | 6/1993 | Germany . | |
| 4142850 | 6/1993 | Germany | 385/49 |
| 4212208A1 | 10/1993 | Germany . | |
| 56-146107 | 11/1981 | Japan | 385/49 |
| 57-68809 | 4/1982 | Japan | 385/83 |
| 57-85015 | 5/1982 | Japan | 385/65 |
| 57-100409 | 6/1982 | Japan | 385/49 |
| 1-29809 | 1/1989 | Japan | 385/49 |

*Primary Examiner*—John Ngo
*Attorney, Agent, or Firm*—McGlew and Tuttle

[57] ABSTRACT

A coupling device between a glass fiber and a dielectric waveguide integrated on a substrate. A low-loss and low-back-scatter, but cost-effective coupling is achieved by that the fiber end being reduced—principally by drawing under heat exposure until breaking—to a diameter in the order of typical core dimensions of dielectric waveguides. A fiber receiving portion is provided on the substrate dimensions reduced in a way substantially corresponding to the glass fiber and the tip thereof changing over into the waveguide to be coupled. The glass fiber, during assembly, need only be inserted into the receiving portion up to a stop, where it is centered with respect to the waveguide, without tolerances.

15 Claims, 3 Drawing Sheets

COUPLING DEVICE BETWEEN A GLASS FIBER AND A DIELECTRIC WAVEGUIDE

FIELD OF THE INVENTION

The present invention relates to a coupling device commonly called fiber/chip coupling, between the glass fiber and a dielectric waveguide integrated on a substrate.

BACKGROUND OF THE INVENTION

In integrated optics/optoelectronics, one of the major problems is the achievement of a cost-effective and low-loss coupling between incoming/outgoing glass fibers and the dielectric waveguides or functional components, resp., on the chip. Because of the small core diameters of the waveguides and thus spot diameters of the guided light in the order of 10 μm, high requirements exist with regard to alignment techniques between glass fibers and a chip, since tolerances in the order of μm would already lead to substantial coupling losses of several dB.

Known in the art is the coupling through planar front faces where basically two different approaches are used:

In a first prior art approach, the alignment between fiber and chip can be performed actively, i.e. the fiber to be coupled is moved by micro-manipulation relative to the chip, with the light source being switched on, until a maximum over-coupling is detected. Then an attachment of the fiber at the chip is made. This approach guarantees minimum coupling losses. However, this approach is expensive, in particular with branching circuits.

The second approach uses passive alignment by means of a fiber guide structure integrated in the substrate of the chip, commonly a V-shaped groove. This groove can be produced in Si by anisotropic etching. The production of a high-grade planar front face at the end of the groove requires special approach steps, such as described, e.g., in DE 41 42 850 and DE 41 34 940. Alternatively, such a groove structure can also be produced in polymers by molding processes, the original mould being produced by a method as described, e.g., in DE 42 12 208.

While the second approach permits, in principle, a cost-effective manufacture of integrated optical components, it will result, however, in comparatively high and not repeatable coupling losses. This is due both because the fiber diameter is subjected to variations, and because the fiber core may be positioned eccentrically to the center axis. While the effects of diameter variations can be reduced by expensive counter-measures, it is by principle impossible to compensate the core eccentricity with passive alignment. Further problems are the manufacture of high-grade front faces at the end of the groove and the occurrence of back-scatter. This is unavoidable in the front-face coupling method in a not always tolerable degree. Such back-scatter is only reduceable by an expensive sloped grind.

SUMMARY AND OBJECTS OF THE INVENTION

It is therefore the object of the present invention to provide a passive fiber/chip coupling technique having repeatable coupling losses comparable in their order to active technology, and wherein the smallest possible back-scatter is generated.

According to the invention, a coupling device between a glass fiber and a dielectric waveguide integrated on a substrate is provided. The glass fiber has a portion which is continuously reduced towards an end. This end is coupled to the waveguide. The reduction is to a diameter in the order of the core dimensions of the dielectric waveguide. A fiber receiving portion is provided on the substrate for guiding the reduced end of the glass fiber into a position opposed to the front face of the waveguide to be coupled.

The coupling device according to the invention is substantially based on the detected fact that by a slow and continuous diameter reduction ("tapering") of the glass fiber down to the order of typical core dimensions of dielectric waveguides, the guided electro-magnetic field can be forced out of the core of the glass fiber into its envelope, or by diameter increase coupled back into the core, without being subjected to substantial losses; a fact permitting, e.g., the achievement of low-loss melt couplers. The diameter reduction of the glass fiber can economically be made by drawing the fiber under heat exposure. In the substrate, on the other hand, a suitable fiber receiving portion is provided leading the tip of the fiber, when inserting the latter towards the core area of the waveguide to be coupled. The guide portion has to be adapted such that at least in the area of the tip, its effective index of refraction is smaller than that of the glass fiber, in order to guarantee in this area a guiding of the electro-magnetic field between the fiber and the substrate. The effective index of refraction of the fiber guiding for inhomogeneous material, i.e. with a not completely embedded fiber, has to be determined following the method presented in IEEE Journal of Quantum Electronics (1988), 766, "The Azimuthal Effective-Index Method", or following a similar method.

With a suitable structure of the glass-fiber tip, of the coupling position and of the waveguide in the integrated optical circuit (this being well known to the man skilled in the art) the coupling losses as well as back-scatter can be held in the desired range.

According to other aspects of the invention, the reduction of the glass fiber is achieved by drawing in a heated condition. The substrate is composed of a polymer having an index of refraction comparatively smaller than that of the glass fiber. The guide face of the fiber guiding portion preferably is comprised of at least two planes. The fiber receiving portion in the substrate is adapted to the reduction profile obtained by the drawing process of the glass fiber. The substrate is composed of a cover portion and a bottom portion each including a portion of the fiber receiving portion, such that the latter completely surrounds the received glass fiber. Between the tip of the glass fiber and the opposed front face of the waveguide a distance exists, and that the thereby produced gap is filled up by a polymer or another optically transparent material having a suitable index of refraction. The core material of the waveguide is brought in a viscous condition onto the substrate and is only cured for securing a glue condition of the glass fiber after the latter is received in the fiber receiving portion.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
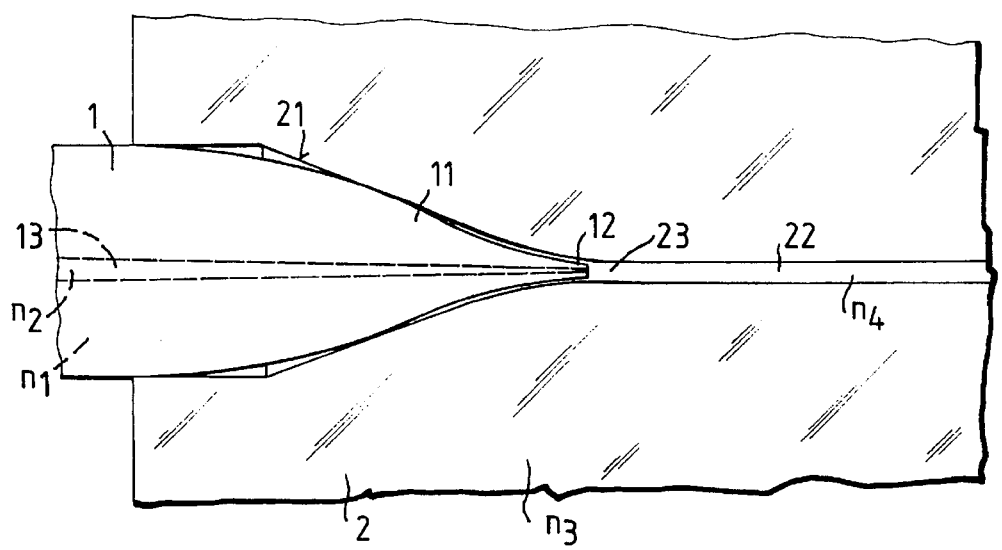
FIG. 1 is a diagrammatical representation of a coupling device according to the invention, in a first embodiment.
Figure 2:
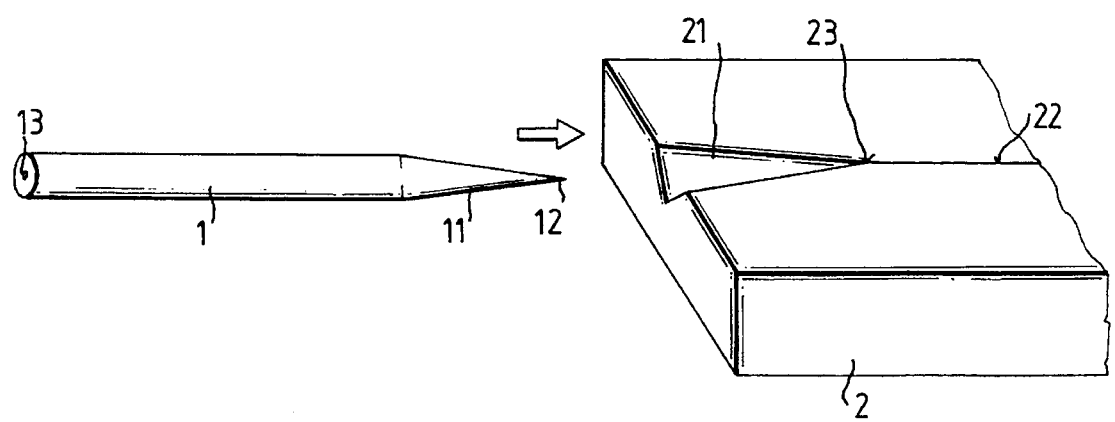
FIG. 2 is a perspective view of the coupling device of FIG. 1.

Referring now to FIGS. 1 and 2, there is shown the basic structure of the coupling device comprising a glass fiber 1 having an index of refraction $n_2$ of the core 13 and the index of refraction of the envelope $n_1 < n_2$. The fiber has at the right-hand side a tapered range 11 with a fiber tip 12. A substrate 2 of the integrated optical circuit (having the index of refraction $n_3$) is provided with a waveguide 22 (having the index of refraction $n_4$) and a fiber receiving portion 21 formed as a tapered opening in the substrate 2. The "tip" 12 of the tapered fiber section should have a diameter in the order of common core dimensions of dielectric waveguides, in order to permit a very close approach to the beginning 23 of the waveguide 22.

The fiber receiving portion 21 need not necessarily have a V-shape opening, as shown in FIG. 2. It is sufficient to guide the glass fiber 1 during insertion along two lines towards the waveguide 22 and to secure an accurate positioning of the glass fiber 1 in the inserted condition. In order to guarantee a field guiding also in the area of the tip 12 of the tapered range 11, the effective index of refraction $n_{3\mathit{eff}}$ in the neighborhood of the tip is smaller than that of the glass fiber envelope $n_1$. In the simplest case, this is to be secured by using a substrate material 2 having an index of refraction $n_3 < n_1$, otherwise the effective index of refraction $n_{3\mathit{eff}}$ can be adjusted to the desired value by a corresponding diameter selection of the fiber receiving portion 21.

The index of refraction $n_4$ of the waveguide 22 has to be larger than the substrate index of refraction $n_3$ and should be dimensioned, together with the waveguide cross section, as is common for the person skilled in the art, such that the field distributions at the tip 12 of the area 11 and at the beginning of the waveguide are matching, as far as possible. As could be shown by simulation calculations, optimum values of the waveguide index of refraction are generally in the order of $n_4 - n_1$.

It is advantageous to use an optically transparent polymer as the substrate 2, since on one hand, its index of refraction $n_3$ can easily be adjusted to the desired value, and on the other hand, the structure of the fiber receiving portion 21 can be achieved in a simple manner by molding a master structure by means of hot-pressing, injection molding or the like. For making a master structure, photo-lithography, anisotropic etching and laser ablation are recommended. Due to the multiple molding possibilities of such a master, the expense for its production are of minor importance, so that even complicated structures can be formed.

If the shape reduction of the area 11 of the glass fiber 1 is achieved by drawing under heat exposure until breaking-off, a non-uniform, but repeatable diameter reduction familiar to the person skilled in the art along the fiber axis will result, this reduction causing even less losses than that of the cone-shaped reduction shown in FIG. 2, so that this method of manufacture is advantageous.

Figure 3:
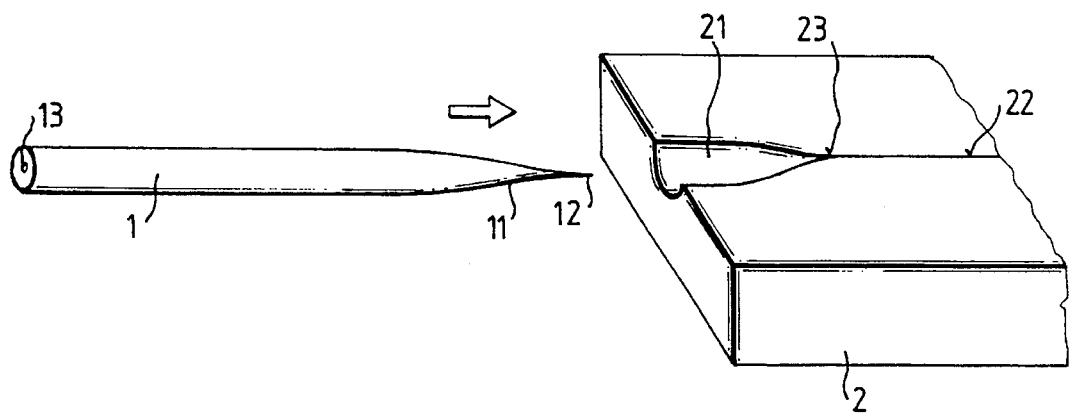
FIG. 3 is a coupling device in a second embodiment of the present invention.

FIG. 3 shows a coupling device adapted to the fiber draw profile. It consists of the same functional elements of glass fiber 1 with tapered (here by drawing) fiber area 11 and the tip 12, as well as the substrate 2 of the integrated optical circuit with the waveguide 22 and the fiber receiving portion 21. Here, however, the fiber receiving portion 21 is adapted as closely as possible to the draw profile of the glass fiber 1, in order to provide it with a safe seat and to minimize scattering losses.

Figure 4:
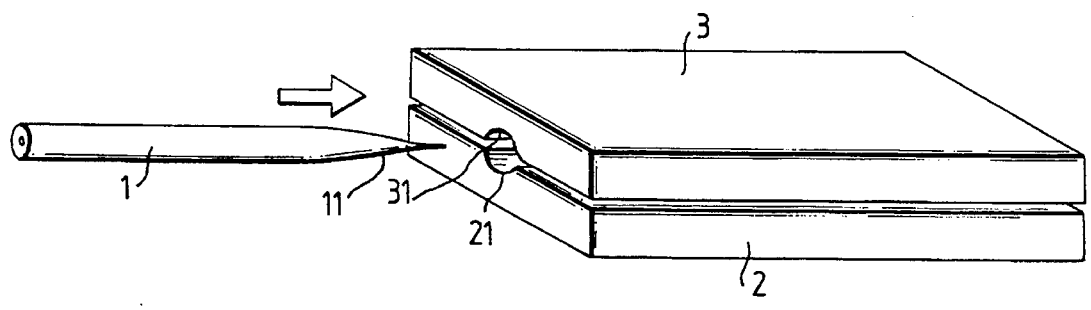
FIG. 4 is a coupling device in a third embodiment of the present invention, and, FIG. 5 is a coupling device in a fourth embodiment of the present invention.

A good fiber guiding and mechanical stability in the assembled condition are guaranteed in the advantageous embodiment shown in FIG. 4. Here, the integrated optical circuit does not only include a substrate 2, but in addition a cover portion 3, which is generally symmetrical to substrate 2, and wherein a portion 31 of the fiber receiving portion is also integrated.

An embodiment particularly advantageous for production is achieved if the waveguiding structures in cover 3 and bottom portion 2 are adapted during pressing/injection molding as grooves, and then these grooves are filled up by a suitable thermally or photo-chemically linkable pre-polymer. After assembling cover 3 and bottom portion 2, the glass fiber can be inserted into the receiving portion 21, 31. Finally, the core material of the waveguide is cured by heat exposure or u.v. radiation, and thereby cover 3, bottom portion 2 and glass fiber 1 are glued to each other.

Figure 5:
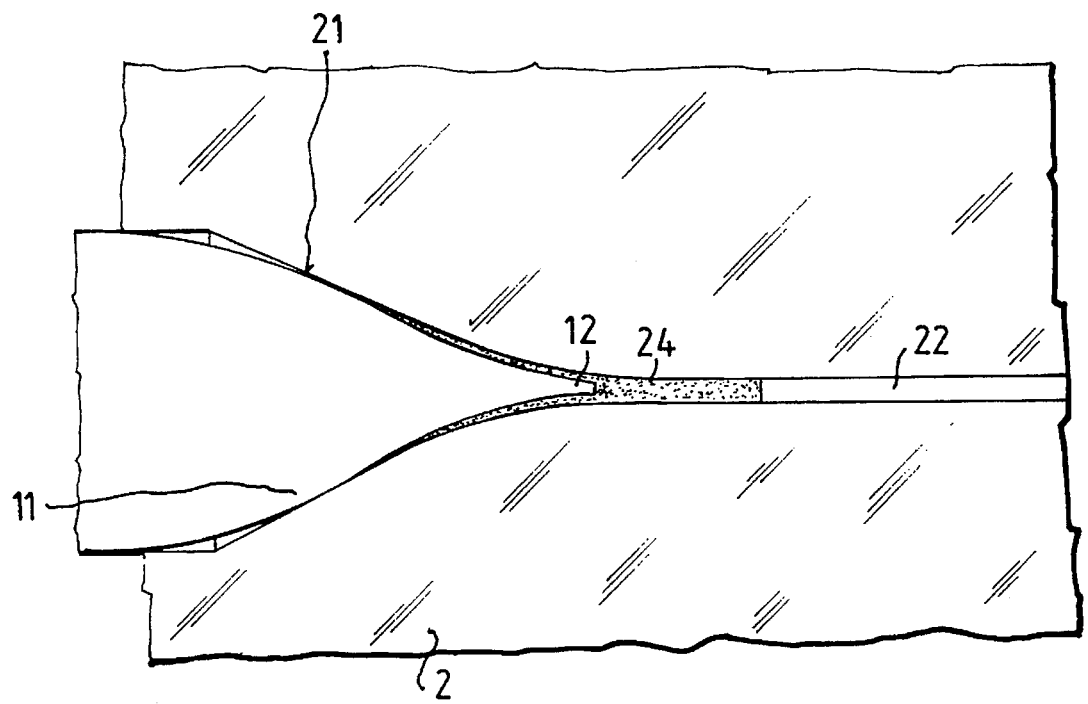

Another advantageous embodiment of the coupling device is shown in detail in FIG. 5. Here, deliberately a gap 24 is left between the waveguide 22 and the tip 12 of the inserted glass fiber 1, in order to fill up this gap 24 afterwards with viscous, but possibly curable material having a corresponding index of refraction, and to thereby achieve the smallest possible coupling losses and back-scatter.

While specific embodiments of the invention have been shown and described in detail to illustrate the application of the principles of the invention, it will be understood that the invention may be embodied otherwise without departing from such principles.

What is claimed is:

1. A coupling device, comprising:
   a glass fiber;
   a substrate with a dielectric waveguide integrated on said substrate, said dielectric waveguide having a core dimension, said glass fiber having an end portion continuously reduced towards a coupling end of said glass fiber, said coupling end having a diameter in the order of said core dimension of said dielectric waveguide, said substrate having a fiber receiving portion for guiding said coupling end of said glass fiber into a position opposed to a front face of said dielectric waveguide, said substrate is composed of a polymer having an index of refraction comparatively smaller than an index of refraction of said glass fiber, said fiber receiving portion has a guide face formed of at least two converging planes.

2. A coupling device according to claim 1, wherein said end portion continuously reduced towards a coupling end of said glass fiber is formed by drawing said glass fiber in a heated condition.

3. A coupling device according to claim 2 wherein said fiber receiving portion is provided corresponding to reduction profile obtained by said drawing said glass fiber.

4. A coupling device according to claim 1, wherein said substrate is composed of a cover portion and a bottom portion, each of said cover portion and a bottom portion including a portion of the fiber receiving portion, such that said fiber receiving portion completely surrounds the received glass fiber.

5. A coupling device according to claim 1 wherein between a tip of said glass fiber at said coupling end and the opposed front face of said waveguide a gap is provided filled up by a polymer or another optically transparent material having a suitable index of refraction.

6. A coupling device according to claim 1 wherein said waveguide includes a core material which is brought in a viscous condition onto said substrate and is only cured for securing a glue condition of the glass fiber after said glass fiber is received in said fiber receiving portion.

7. A coupling device comprising:

a glass fiber having an end portion with a diameter tapering down to form a fiber tip;

a substrate including a dielectric waveguide integrated on said substrate, said waveguide having a core dimension, said core dimension having a diameter of a same order of magnitude as said fiber tip, said substrate including fiber receiving means for receiving said glass fiber and guiding said glass fiber to position said glass fiber in three dimensions with respect to said dielectric waveguide, said fiber receiving means defining a tapered opening for cooperating with said end portion of said glass fiber to guide said fiber tip of said glass fiber into a position opposed to a front face of said waveguide, said tapered opening having a shape corresponding to said end portion.

8. A device in accordance with claim 7, wherein:

a portion of said substrate surrounding said fiber receiving means and said end portion have an index of refraction smaller than an index of refraction of said glass fiber, and are formed of a polymer.

9. A device in accordance with claim 7, wherein:

said tapered opening has a larger diameter end substantially similar in magnitude to a diameter of said glass fiber, said tapered opening also has a smaller diameter end positioned adjacent said front face of said waveguide and substantially similar in magnitude to said fiber tip.

10. A device in accordance with claim 7, further comprising:

transparent viscous material positioned in said tapered opening and between said end portion of said glass fiber and said substrate, said viscous material having an index of refraction to reduce coupling losses and backscatter between said glass fiber and said waveguide.

11. A method for coupling a glass fiber to a dielectric waveguide, the method comprising the steps of:

forming an end portion on the glass fiber with a diameter tapering down to form a fiber tip;

providing a substrate integrated with the dielectric waveguide and defining a tapered opening leading from an exterior of said substrate to a front face of the waveguide, said tapered opening having a larger diameter end substantially similar in magnitude to a diameter of the glass fiber, said tapered opening having a smaller diameter end substantially similar in magnitude to said fiber tip, said tapered opening having a shape adapted to said end portion;

inserting said end portion of said glass fiber into said tapered opening to guide said fiber tip to a position opposed to a front face of the dielectric waveguide.

12. A method in accordance with claim 11, wherein:

said end portion of the glass fiber is formed by drawing the glass fiber in a heated condition.

13. A method in accordance with claim 12, wherein:

said tapered opening is shaped to compliment said end portion.

14. A device in accordance with claim 9, wherein:

said tapered opening is complimentary to said fiber tip.

15. A device in accordance with claim 14, wherein:

said fiber tip has a shape similar to a draw profile of a glass fiber.

\* \* \* \* \*

UNITED STATES PATENT AND TRADEMARK OFFICE
CERTIFICATE OF CORRECTION

PATENT NO. : 5,594,824
DATED : January 14, 1997
INVENTOR(S) : KERNDLMAIER

It is certified that error appears in the above-indentified patent and that said Letters Patent is hereby corrected as shown below:

On the title page, correct the Assignee to read as follows:

--[73] Assignee: Institut für Mikrotechnik Mainz GmbH
Mainz-Hechtsheim, Germany--

Signed and Sealed this

First Day of April, 1997

Attest:

BRUCE LEHMAN

Attesting Officer

Commissioner of Patents and Trademarks